(12) United States Patent
Cheung et al.

(10) Patent No.: US 9,331,629 B2
(45) Date of Patent: May 3, 2016

(54) PHOTOVOLTAIC FRAME FASTENER

(75) Inventors: Brian C. Cheung, San Francisco, CA (US); Luc DuPont, Lans-en-Vercors (FR)

(73) Assignee: A. Raymond et Cie, Grenoble (FR)

( * ) Notice: Subject to any disclaimer, the term of this patent is extended or adjusted under 35 U.S.C. 154(b) by 919 days.

(21) Appl. No.: 13/539,814

(22) Filed: Jul. 2, 2012

(65) Prior Publication Data
US 2014/0003861 A1 Jan. 2, 2014

(51) Int. Cl.
*H02S 20/23* (2014.01)
*F24J 2/52* (2006.01)
*F16B 7/04* (2006.01)
*F24J 2/46* (2006.01)

(52) U.S. Cl.
CPC .............. *H02S 20/23* (2014.12); *F24J 2/5256* (2013.01); *F16B 7/0473* (2013.01); *F24J 2002/4663* (2013.01); *F24J 2002/4665* (2013.01); *Y02B 10/12* (2013.01); *Y02E 10/47* (2013.01); *Y10T 403/54* (2015.01)

(58) Field of Classification Search
CPC ....... F24J 2/5203; F24J 2/5262; F24J 2/5205; F24J 2/5207; F24J 2/5245; F24J 2/5256; F24J 2/5254; F24J 2002/5213; F24J 2002/522; F24J 2002/4665; F24J 2002/4674; F24J 2002/4663
See application file for complete search history.

(56) References Cited

U.S. PATENT DOCUMENTS

| | | |
|---|---|---|
| 3,757,268 A | 9/1973 | Genovese et al. |
| 3,998,018 A | 12/1976 | Hodges |
| 4,106,251 A | 8/1978 | Nelsson |
| 4,113,982 A | 9/1978 | Glaesel |
| 4,189,881 A | 2/1980 | Hawley |
| 4,195,895 A | 4/1980 | Ziegler |
| 4,215,677 A | 8/1980 | Erickson |
| 4,256,359 A | 3/1981 | Storck |
| 4,406,505 A | 9/1983 | Avramovich |
| 4,833,848 A | 5/1989 | Guerin |

(Continued)

FOREIGN PATENT DOCUMENTS

| | | |
|---|---|---|
| DE | 202009004746 U1 | 7/2009 |
| DE | 102010022556 B3 | 6/2011 |

(Continued)

OTHER PUBLICATIONS

A Raymond drawing entitled "Solar clip Specific part"; Part No. 214803-1-00, for non-grounding clip shown in Solardis brochure; 1 page. (believed to have been offered for sale in U.S. or published on or before Jul. 7, 2010).

(Continued)

*Primary Examiner* — Daniel Wiley
(74) *Attorney, Agent, or Firm* — Harness, Dickey & Pierce, P.L.C.

(57) ABSTRACT

A photovoltaic frame fastener is provided. In one aspect, a photovoltaic frame attachment apparatus includes a strut or rail defining a generally U-shaped channel and a snap-in clip or fastener. In another aspect, a single-piece fastener includes a strut-engaging surface, at least one flexible wing matable with an opening in a strut, a flexible tongue internally projecting in a central manner from a top wall of a body, and a slot adapted to receive a portion of a photovoltaic panel frame. Yet another aspect of a photovoltaic frame fastener includes laterally projecting tabs abutting against a top of a strut.

35 Claims, 17 Drawing Sheets

(56) References Cited

U.S. PATENT DOCUMENTS

| | | |
|---|---|---|
| 4,875,876 A | 10/1989 | O'Loughlin |
| 5,092,939 A | 3/1992 | Nath et al. |
| 5,232,518 A | 8/1993 | Nath et al. |
| 5,409,549 A | 4/1995 | Mori |
| 5,419,606 A | 5/1995 | Hull et al. |
| 5,571,338 A | 11/1996 | Kadonome et al. |
| 5,762,720 A | 6/1998 | Hanoka et al. |
| 6,105,317 A | 8/2000 | Tomiuchi et al. |
| 6,111,189 A | 8/2000 | Garvison et al. |
| 6,186,698 B1 | 2/2001 | Knapp |
| 6,269,596 B1 | 8/2001 | Ohtsuka et al. |
| 6,370,828 B1 | 4/2002 | Genschorek |
| 6,405,494 B1 | 6/2002 | Wismeth |
| 6,495,750 B1 | 12/2002 | Dinwoodie |
| 6,501,013 B1 | 12/2002 | Dinwoodie |
| 6,534,703 B2 | 3/2003 | Dinwoodie |
| 6,570,084 B2 | 5/2003 | Dinwoodie |
| 6,672,018 B2 | 1/2004 | Shingleton |
| 6,784,360 B2 | 8/2004 | Nakajima et al. |
| 6,809,253 B2 | 10/2004 | Dinwoodie |
| 6,959,517 B2 | 11/2005 | Poddany et al. |
| 6,994,504 B2 | 2/2006 | Gordon |
| 7,195,513 B1 | 3/2007 | Gherardini et al. |
| 7,217,058 B2 | 5/2007 | Herb |
| 7,260,918 B2 | 8/2007 | Liebendorfer |
| 7,297,866 B2 | 11/2007 | Aschenbrenner |
| 7,435,134 B2 | 10/2008 | Lenox |
| 7,592,537 B1 | 9/2009 | West |
| 7,600,349 B2 | 10/2009 | Liebendorfer |
| 7,621,487 B2 | 11/2009 | Brown et al. |
| 7,634,875 B2 | 12/2009 | Genschorek |
| 7,745,722 B2 | 6/2010 | Warfield et al. |
| 7,748,175 B2 | 7/2010 | Liebendorfer |
| 7,758,011 B2 | 7/2010 | Haddock |
| 7,766,292 B2 | 8/2010 | Liebendorfer |
| 7,780,472 B2 | 8/2010 | Lenox |
| 7,797,883 B2 | 9/2010 | Tarbell et al. |
| 7,866,099 B2 | 1/2011 | Komamine et al. |
| 7,921,607 B2 | 4/2011 | Thompson et al. |
| 7,971,398 B2 | 7/2011 | Tweedie |
| 7,987,641 B2 | 8/2011 | Cinnamon |
| 8,025,508 B2 | 9/2011 | Parker et al. |
| 8,109,048 B2 | 2/2012 | West et al. |
| 8,136,310 B2 | 3/2012 | Tweedie |
| 8,181,926 B2 | 5/2012 | Magno, Jr. et al. |
| 8,595,997 B2 | 12/2013 | Wu |
| 2003/0101662 A1 | 6/2003 | Ullman |
| 2003/0177706 A1 | 9/2003 | Ullman |
| 2006/0156648 A1 | 7/2006 | Thompson et al. |
| 2008/0035140 A1 | 2/2008 | Placer et al. |
| 2008/0053517 A1 | 3/2008 | Plaisted et al. |
| 2008/0245404 A1 | 10/2008 | DeLiddo |
| 2009/0242014 A1 | 10/2009 | Leary |
| 2010/0180933 A1 | 7/2010 | Aftanas et al. |
| 2010/0192505 A1 | 8/2010 | Schaefer et al. |
| 2010/0236542 A1 | 9/2010 | Pierson et al. |
| 2010/0263297 A1 | 10/2010 | Liebendorfer |
| 2010/0276558 A1 | 11/2010 | Faust et al. |
| 2011/0036028 A1 | 2/2011 | Beck |
| 2011/0039430 A1 | 2/2011 | Aftanas |
| 2011/0097137 A1 | 4/2011 | Spitz |
| 2011/0100433 A1 | 5/2011 | Jonczyk |
| 2011/0138585 A1 | 6/2011 | Kmita et al. |
| 2011/0147553 A1 | 6/2011 | Ostermeier et al. |
| 2011/0203637 A1 | 8/2011 | Patton et al. |
| 2011/0214366 A1 | 9/2011 | Haddock et al. |
| 2011/0232212 A1 | 9/2011 | Pierson et al. |
| 2011/0284058 A1 | 11/2011 | Cinnamon |
| 2012/0060901 A1 | 3/2012 | Schnitzer |
| 2012/0313355 A1 | 12/2012 | Grabowski et al. |

FOREIGN PATENT DOCUMENTS

| | | |
|---|---|---|
| EP | 0671581 A2 | 9/1995 |
| FR | 2163787 A5 | 7/1973 |
| FR | 2209024 A1 | 6/1974 |
| GB | 423385 A | 1/1935 |
| GB | 1218275 A | 1/1971 |
| GB | 1510258 A | 5/1978 |
| JP | 7243428 A | 9/1995 |
| JP | 10266499 A | 10/1998 |
| JP | 10339008 A | 12/1998 |
| KR | 10201101164 | 10/2011 |
| NL | 8304155 A | 7/1985 |
| WO | WO-8301476 A1 | 4/1983 |
| WO | WO-9816699 A1 | 4/1998 |
| WO | WO-2010149278 A1 | 12/2010 |

OTHER PUBLICATIONS

Solardis; Brochure; "soprasolar fix"; www.soprasolar.com; Jul. 7, 2010; pp. 1-10.

Rayvolt; Internet Advertisement Publication; "Panel fasteners"; Raygroup; May 2011.

altEstore; Internet Advertisement Publication; "Groundings Lugs With Set Screw"; www.altestore.com; Aug. 25, 2011.

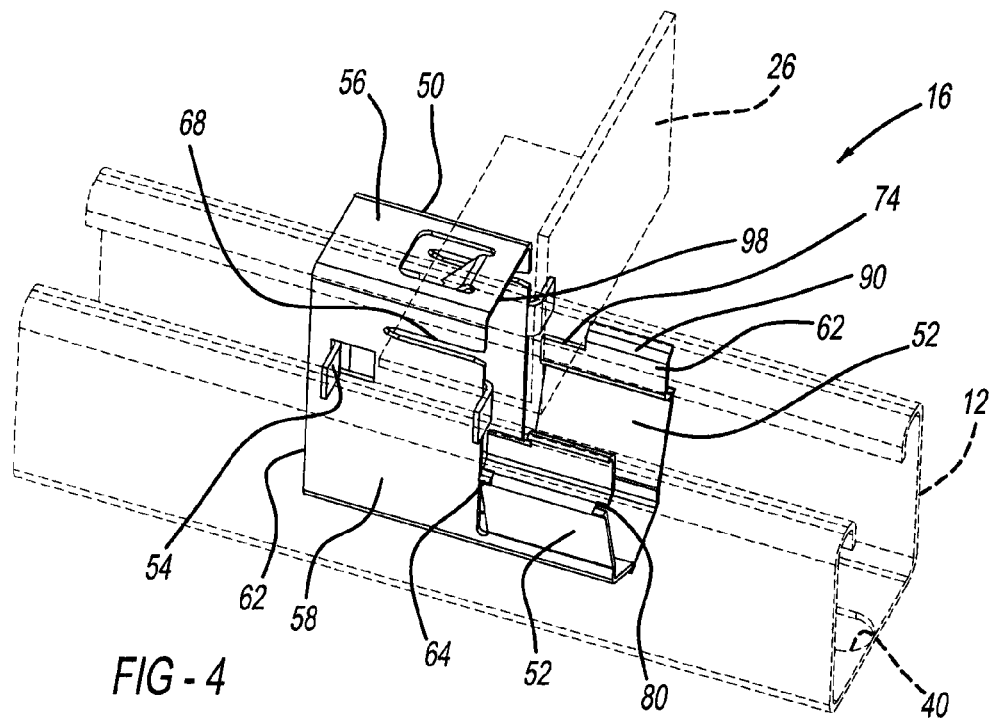
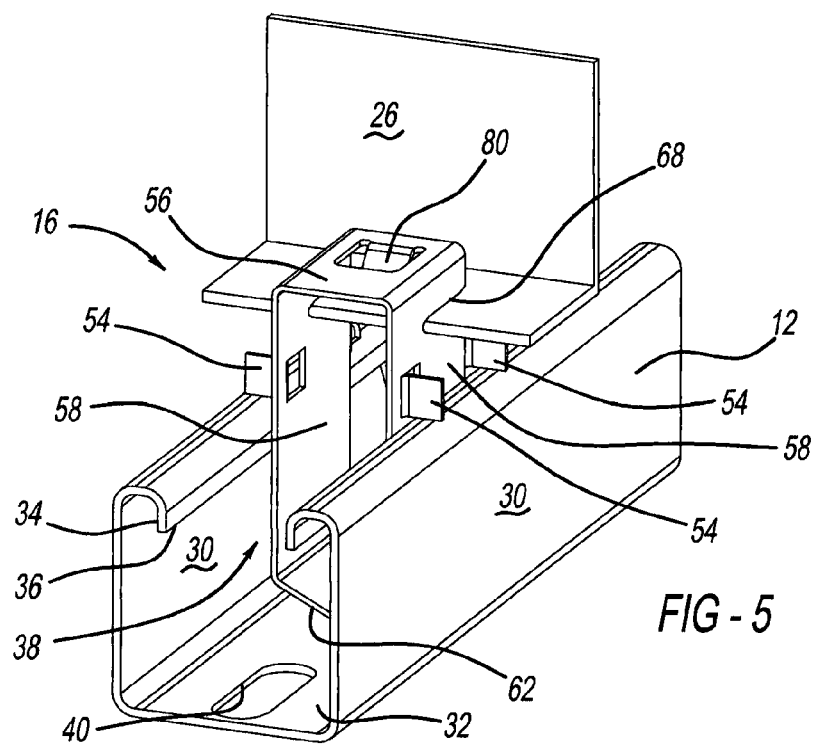

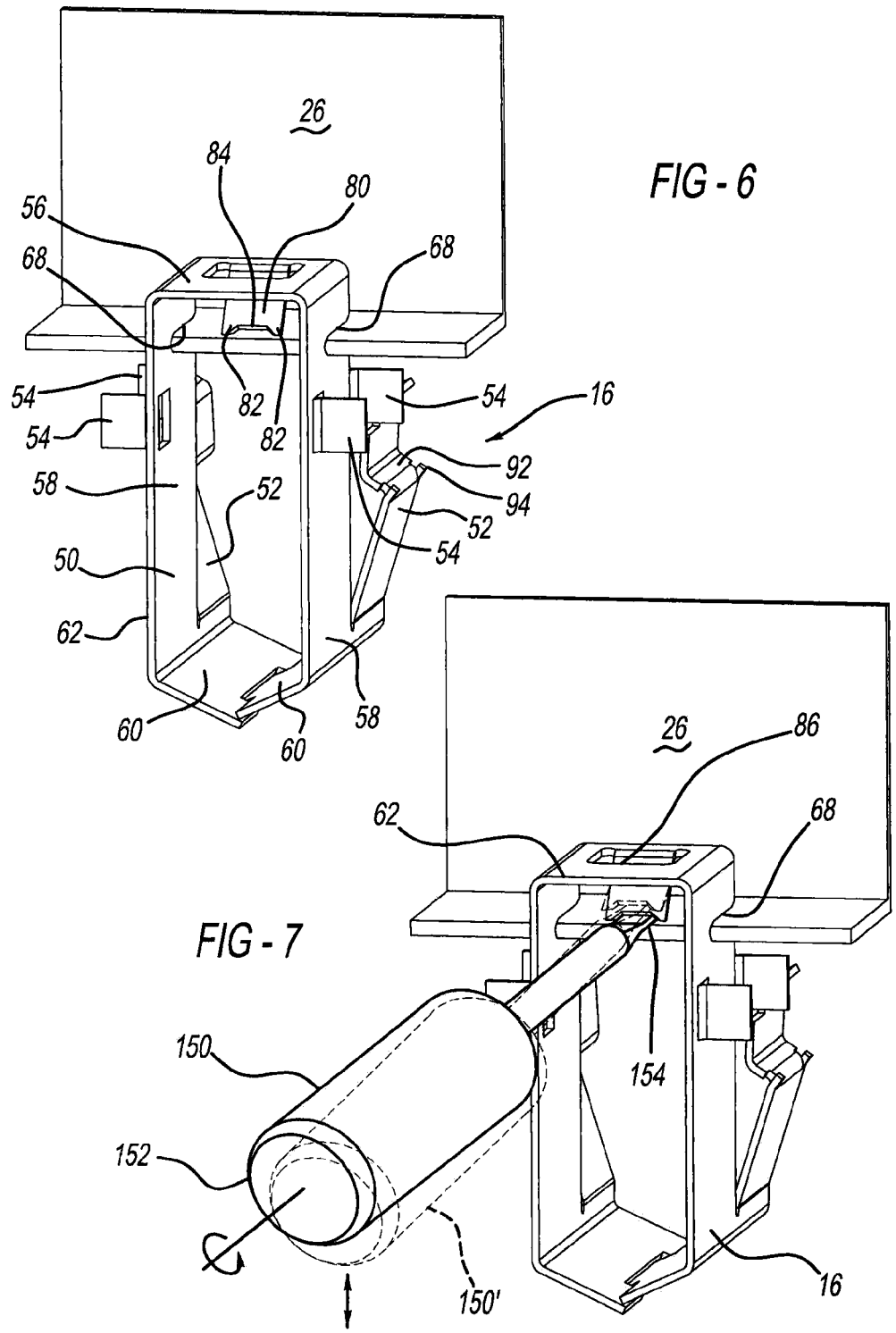

PHOTOVOLTAIC FRAME FASTENER

BACKGROUND AND SUMMARY

The present disclosure relates generally to a fastener and more particularly to a photovoltaic frame fastener.

Traditionally, peripheral mounting frames holding solar or photovoltaic panels are mounted to a supporting structure on a building roof or on the land through use of threaded fasteners and multi-piece brackets. Exemplary traditional devices are disclosed in U.S. Pat. No. 7,758,011 entitled "Adjustable Mounting Assembly for Standing Seam Panels" which issued to Haddock on Jul. 20, 2010, and U.S. Pat. No. 6,105,317 entitled "Mounting System For Installing an Array of Solar Battery Modules of a Panel-Like Configuration on a Roof" which issued to Tomiuchi et al. on Aug. 22, 2000. These patents are incorporated by reference herein. These devices, however, have many loose parts, and are time consuming and complex to install on a job site, such as on top of a windy roof, which thereby incurs significant labor expense and effort.

Another solar panel module fastener is disclosed in German Patent Publication No. 10 2010 022 556 by Klaus Hullmann et al. A fastener removal tool, useable from above the solar panels and having ends inserted into a rail opening, is also disclosed. While this fastener and tool are noteworthy advances in the industry, further improvements are desirable.

In accordance with the present invention, a photovoltaic frame fastener is provided. In one aspect, a photovoltaic frame attachment apparatus includes a strut or rail defining a generally U-shaped channel and a snap-in clip or fastener. In another aspect, a single-piece fastener includes a strut-engaging surface, at least one flexible wing matable with an opening in a strut, a flexible tongue internally projecting in a central manner from a top wall of a body, and a slot adapted to receive a portion of a photovoltaic panel frame. In a further aspect, the central tongue has at least one formation for securing the frame in the slot. Yet another aspect of a photovoltaic frame fastener includes laterally projecting tabs abutting against a top of a strut. A bifurcated tongue is employed in an additional aspect. Moreover, a method of attaching a photovoltaic frame to an elongated structure is also provided.

The present photovoltaic frame fastener is advantageous over traditional devices. For example, the one-piece nature of the present fastener is inexpensive and fast to manufacture, install and remove. Furthermore, the present fastener is suitable for pre-assembly to the frame offsite or at a manufacturing plant, thereby improving quality and reducing assembly cost. Moreover, the present fastener advantageously hides the snap-in wing sections securing the frame and strut, thereby making theft and vandalism difficult. In an embodiment where a snap-in wing and frame receiving slot are directly below a flexible retaining tongue, the retention forces are direction in-line thereby advantageously reducing torsion on the fastener which achieves a more secure attachment with less stress on the fastener, frame and solar panel, and requiring lower installation force. In the lateral tab embodiment, a more secure attachment is realized by reducing side-to-side and/or front-to-back tilting, while also preventing over-insertion of a fastener into a strut opening. Additional advantages and features of the present invention will become apparent from the following description and appended claims taken in conjunction with the accompanying drawings.

BRIEF DESCRIPTION OF THE DRAWINGS

FIG. 4 is a perspective view showing the first embodiment photovoltaic frame fastener assembly;

FIG. 5 is a perspective view showing the first embodiment photovoltaic frame fastener assembly, taken opposite that of FIG. 4;

FIG. 6 is a perspective view like that of FIG. 5, showing the first embodiment photovoltaic frame fastener assembly, without a strut;

FIG. 7 is a perspective view like that of FIG. 6, showing the first embodiment photovoltaic frame fastener assembly, with an upper removal tool;

DETAILED DESCRIPTION

Figure 1:
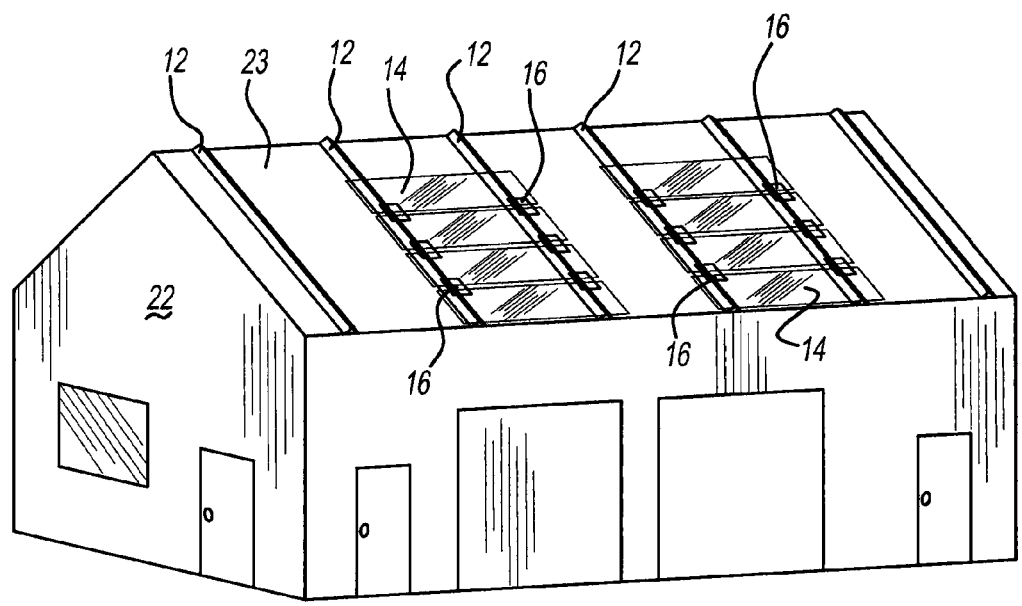
FIG. 1 is a perspective view showing a photovoltaic frame fastener assembly mounted to a building roof.
Figure 2:
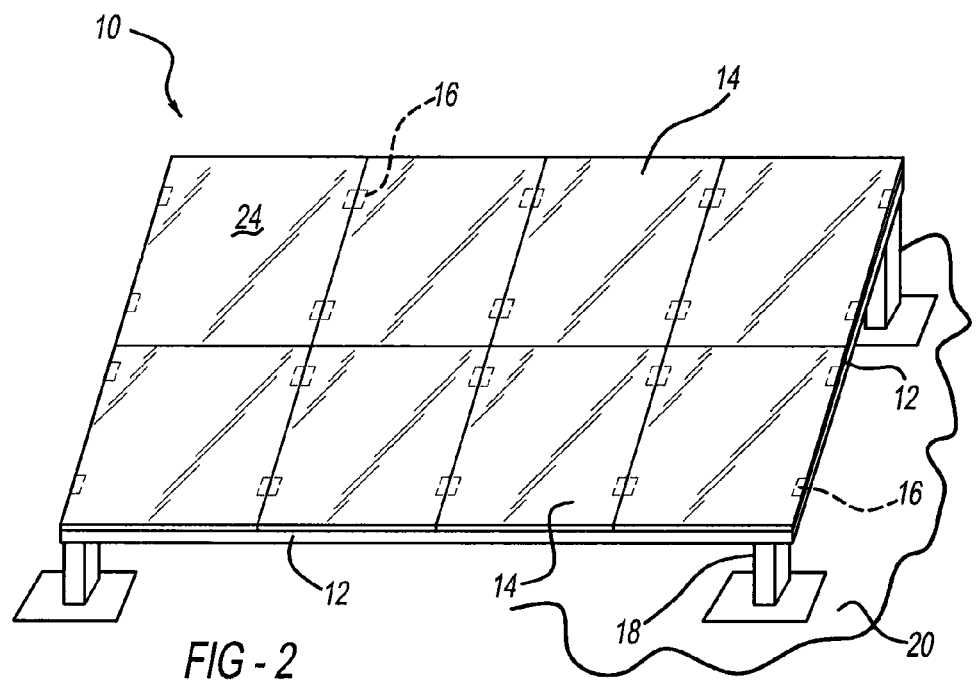
FIG. 2 is a perspective view showing a photovoltaic frame fastener assembly mounted to the ground.
Figure 3:
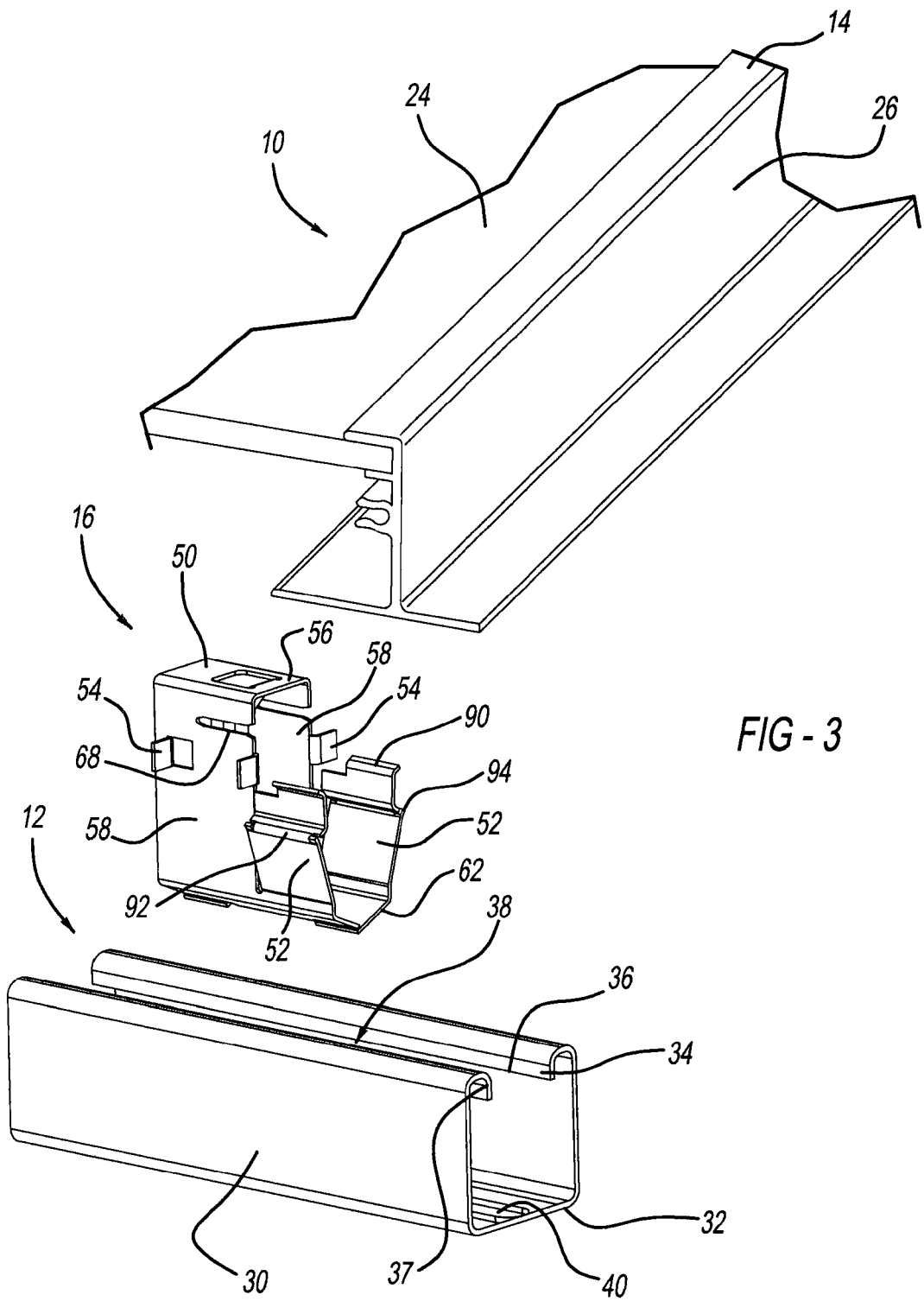
FIG. 3 is an exploded perspective view showing a first preferred embodiment of a photovoltaic frame fastener assembly.

Referring to FIGS. 1-3, a first embodiment of a photovoltaic frame fastener assembly 10 includes elongated and rigid rails or struts 12, solar or photovoltaic panel modules 14, and fasteners 16. Struts 12 are mounted to vertical legs 18 attached to land or ground 20 in one configuration. In another configuration, struts 12 are bolted onto a roof clamp or other structure on a roof or side of a building 22. Each photovoltaic module 14 includes a chemically coated glass photovoltaic panel 24 and an adhesively attached, peripheral metallic frame 26. Glass photovoltaic panel 24 and metallic frame 26 are provided as a pre-assembled unit or may be provided as separate units to the installation site.

As best shown in FIGS. 3-5 and 8, strut 12 has a uniform and generally U-shaped cross-section as defined by upstanding sidewalls 30 joined by a bottom wall 32. A reverse-turned wall 34 extends from a top end of each sidewall 30 and terminates in a downwardly directed edge 36. Downwardly directed edge 36 provides a folded-over region of upstanding sidewalls 30 and as detailed below provide attachment points for wings of fasteners 16. An elongated channel or opening 38 is defined between reverse turn walls 34. Optional mounting holes 40 are provided in bottom wall 32 to allow for securing of strut 12 to a building attachment, bolt upwardly projecting from a standing seam roof clamp, or ground-based support. Strut 12 is stamped or rolled from aluminum or steel.

Referring now to FIGS. 3-6, fastener 16 includes a body 50, a pair of flexible wings 52, and four rigid tabs 54. Body 50 includes a top wall 56, a pair of spaced apart side walls 58 and tapered lead-in walls 60. The walls of body 50 and wings 52 define peripheral edges 62 that allow for hollow open access at ends thereof. Furthermore, lead-in walls 60 cross and overlap each other adjacent distal edges thereof. A pair of aligned and elongated openings or slots 68 are disposed in an upper area of body 50 above at least some of tabs 54. Each slot 68 has an openly accessible end and they both receive a flat segment of metallic frame 26 inserted therein to secure photovoltaic module 14 to fastener 16.

A flexible tongue member 80 is downwardly and diagonally bent from an inside of top wall 56 of fastener 16. A distal edge of tongue 80 includes multiple, preferably two, generally pointed formations 82 separated by a recess or valley 84. Formations 82 gouge or score into a top surface of frame 26 to secure frame 26 within slots 68 of fastener 16. The diagonal and flexible nature of tongue 80 allows for low effort installation of frame 26 into slots 68 but significantly greater (at least four times) removal force. Tongue 80 is centrally inboard of all peripheral fastener edges 62 adjacent to a central hole 86 in top wall 56.

An inwardly curved finger 90 upwardly projects from a top section of each wing 52. Finger 90 has a smaller width (the width being in the elongated direction of strut 12) than does the adjacent wing 52. Each wing 52 further has an offset angled step 92 at an apex, defining a thickness dimension of the collective wings. Barbs or outwardly and localized arms 94 are located on the lateral edges adjacent each step 92 to more securely engage downturned edges 36 of strut.

Reference should now be made to FIGS. 16-24 which show another embodiment of a photovoltaic frame fastener 100 of the present invention. Fastener 100 includes a top wall 102, side walls 104 and tapered lead-in walls 106 like with the prior embodiment fastener 16. Furthermore, a frame receiving slot 108 is located within each side wall 104 and a flexible and bifurcated tongue 110 is downwardly bent from top wall 102 like with the prior embodiment. At least two, and more preferably four, rigid tabs 112 outwardly extend in a generally parallel manner to each other and perpendicular from each associated side wall 104. Tabs 112, like with the prior embodiment, abut against an outside surface of strut 12 adjacent the opening therein, to deter tilting of the fastener and also to prevent over-insertion of the fastener too far into the strut during installation. Each tab 112 has a greater longitudinal dimension a than a width dimension b, in order to increase the longitudinal rigidity and stiffness of the tab.

Different than the prior embodiment, the present fastener 100 has a pair of flexible wings 120 which are outwardly bent from side walls 104 adjacent lead-in walls 106, but longitudinally directly below slots 108. This alignment advantageously reduces undesired torque imparted on fastener 100 due to a lateral offset of slots 68 (see FIG. 4) versus wings 52 of the prior embodiment fastener. Additionally, the present fastener 100 is more compact and the wings 120 are better hidden by the attached solar panel module and frame 26 thereabove. For example, a longitudinal dimension L is greater than both a width W and a total nominal thickness T, for this embodiment.

A finger 126 centrally extends from an upper edge of each wing 120 generally between a pair of adjacent tabs 112. Each finger 126 has an outwardly curved distal end opposite the corresponding step 128 of each wing. Moreover, finger 126 has a smaller lateral width as compared to adjacent wing 120 in order to allow for material size savings of a sheet metal blank 130 from which fastener 100 is stamped and bent as a single, metallic piece. A stiffening rib or bead 132 is also provided along a generally flat outwardly angled section of each wing 120 to provide compressive strength to resist inadvertent disassembly from strut 12 after the wings have been snapped into engagement with return edge of the strut during assembly. Fastener 100 resists at least 100 pounds of pullout force from strut 12 without destruction.

When fully installed, the solar panel module hides a majority of each fastener 16 and 100. This feature advantageously deters theft of the solar panel module 14 by making it less clear to a casual observer that compression together of the wings will allow detachment of the fastener from strut 12. Fasteners 16 and 100 are preferably stamped from a Magni coated and austemper heat treated spring steel of type SAE 1050-1065, with a finish hardness of 44-51 Rc, and a sheet thickness of 1.0 nm, but alternately may be stamped from stainless steel.

Figure 8:
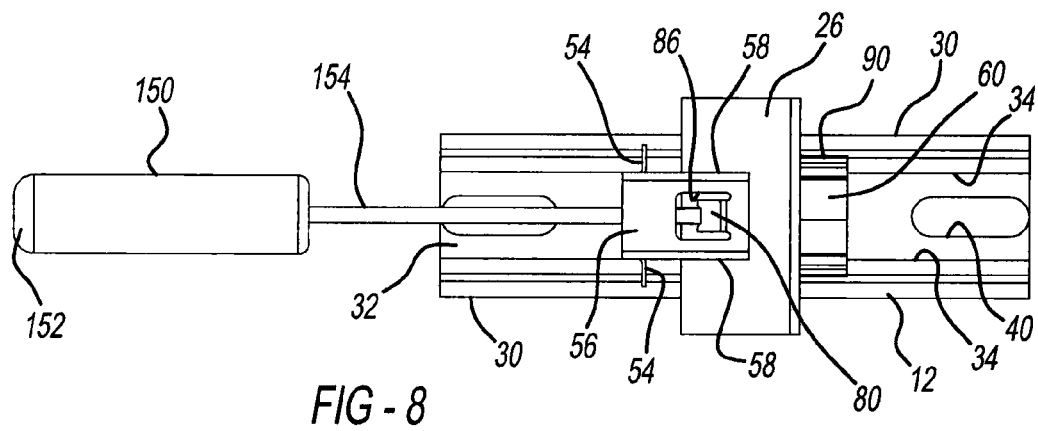
FIG. 8 is a top elevational view showing the first embodiment photovoltaic frame fastener assembly, with the upper removal tool.

FIGS. 7 and 8 illustrate an upper removal tool 150 used to disengage photovoltaic frame 26 from either fastener 16 or 100. Exemplary fastener 16 will be referenced hereinafter although it should be appreciated that any of the removal tools can be used for either of the fasteners.

Upper removal tool 150 is preferably a screwdriver having an enlarged handle 152, an elongated rigid shaft 154 and a flat blade 154. The construction or service person initially inserts screwdriver tool 150 in a linear and lateral direction into the hollow opening of fastener 16 between the side walls and below the glass solar module. This may be either done from below the assembly as space allows, or after the fastener is removed from the strut as will be described in further detail hereinafter. Blade 154 is linearly and horizontally inserted between valley 84 (see FIG. 6) and the segment of frame 26 that is within slots 68. Thereafter, the construction person rotates tool 150 by either linearly pushing down to the position 150' or by rotating the tool about is centerline, thereby providing leverage to push the tongue 80 and associated pointed formations 82 upwardly and away from the adjacent segment of frame 26. Concurrently or subsequently, the construction person linearly pulls frame 26 out of slots 68 since tongue 80 is no longer deterring removal thereof. The torsion upon tool 150 will then cease and the tool removed. It should be appreciated that other lever type tools can be employed as long as they can impart the same tongue flexure during frame removal, preferably without over-flexing or damaging either the fastener or frame, so that they can be reused if desired.

Figure 9:
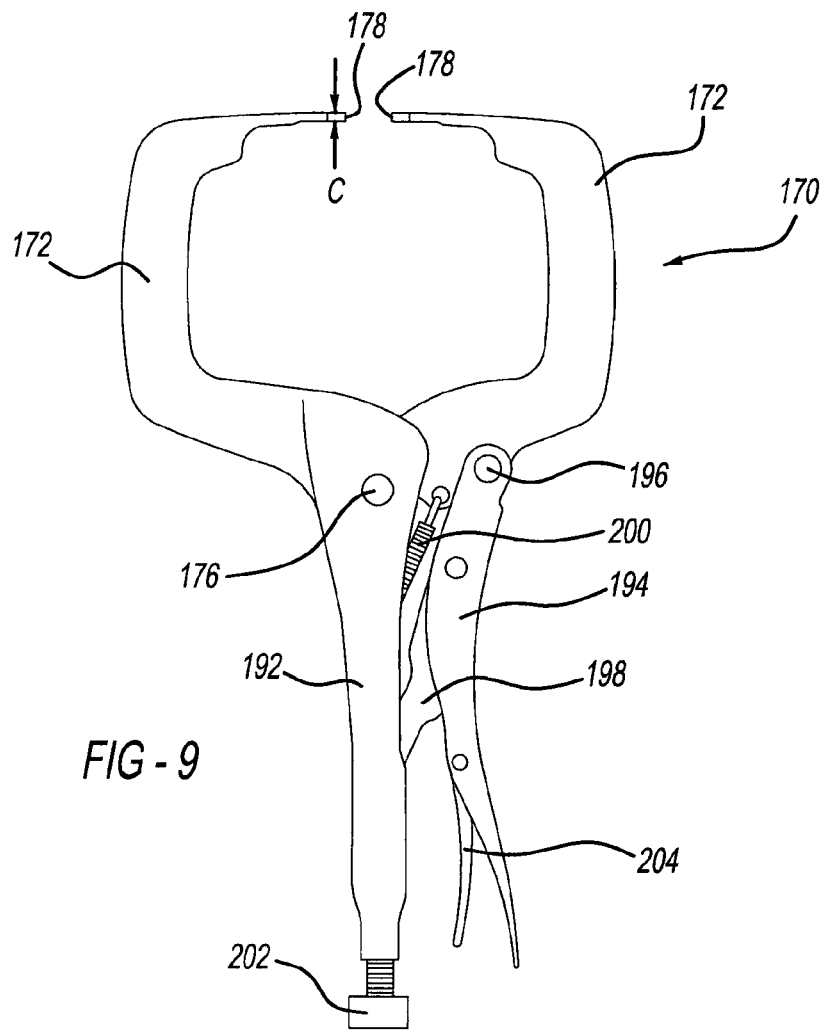
FIG. 9 is a side elevational view showing one embodiment of a lower removal tool used with the photovoltaic frame fastener assembly.

A first embodiment of a lower removal tool 170 is shown in FIG. 9. This tool has a pair of generally C-shaped jaws 172 which are spaced apart from each other by at least three inches to create a large central void 174. The proximal ends of jaws 172 are coupled together by way of one or more pivots 176. An opposite distal end of each jaw 172 has a generally flattened and straight tip 178. Furthermore, the thickness C of each tip 178 is less than one-quarter of that for the nominal central portion of each jaw 172.

A primary handle 192 is integrally formed as part of one jaw 172. A separate auxiliary handle 194 is coupled to the other jaw 172 via one or more pivots 196. A camming link 198 pivotally couples the handles together as does a biasing spring 200. An adjustment screw 202 is threadably received within primary handle 192 for setting the adjusted position of camming link 198. Additionally, a release handle 204 is pivotally coupled to handle 194 for releasing a clamped and locked state of tool 170. The handle and locking mechanism work in accordance with U.S. Pat. No. 8,056,451 entitled "Locking Pliers" which issued to Chervenak et al. on Nov. 15, 2011, which is incorporated by reference herein. This tool embodiment can be used from below the fastener and strut as further discussed hereinafter, or is well suited for engaging laterally offset wings 52 (see FIG. 3) of fastener 16 from above and between adjacent photovoltaic panel modules 14.

Figure 10:
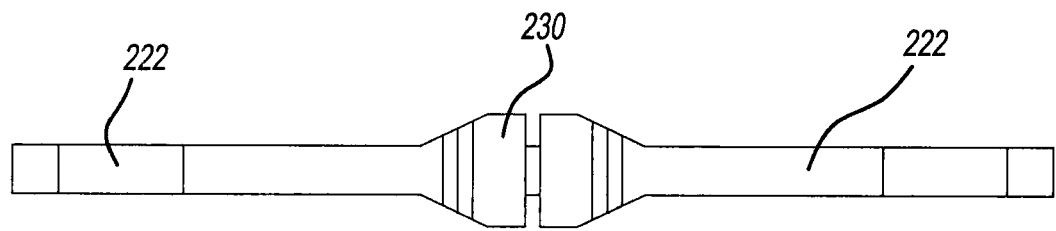
FIG. 10 is a top elevational view showing a second embodiment of the lower removal tool used with the photovoltaic frame fastener assembly.
Figure 11:
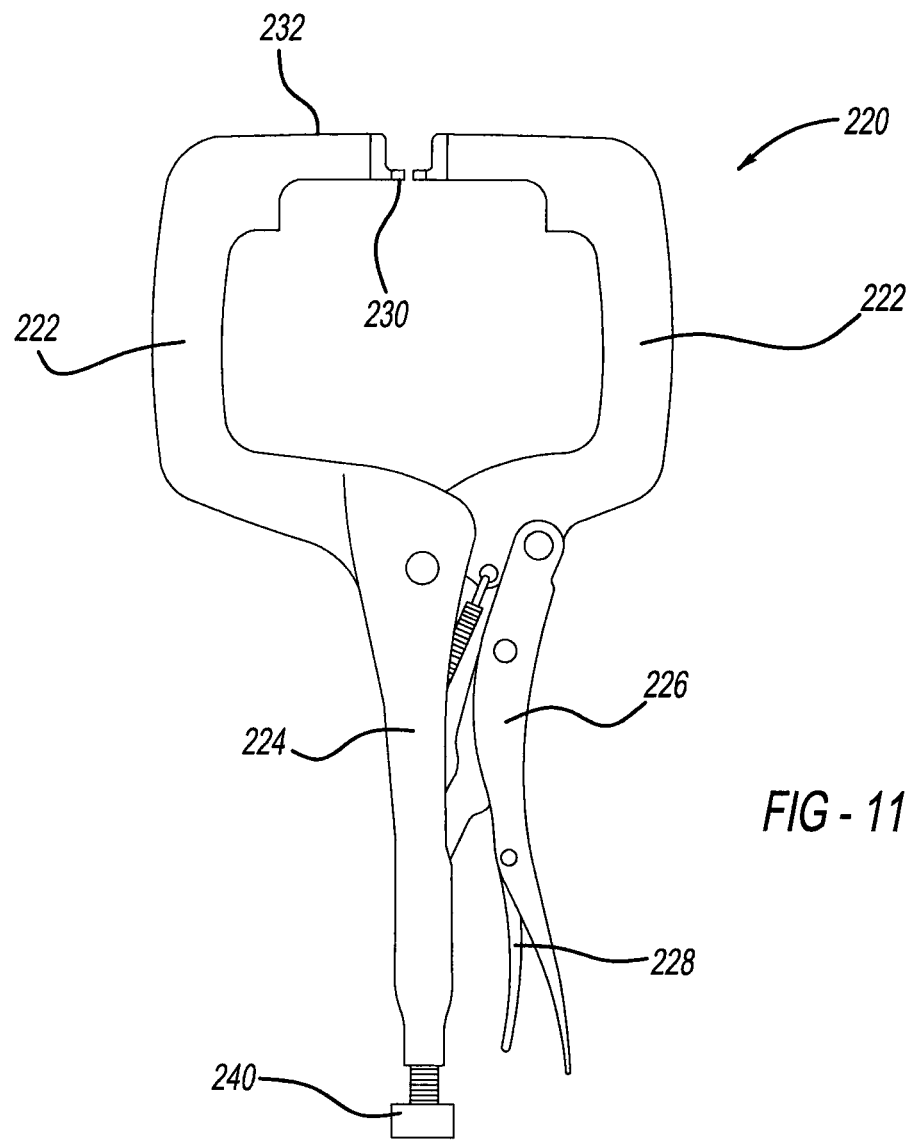
FIG. 11 is a side elevational view showing the lower removal tool of FIG. 10.
Figure 12:
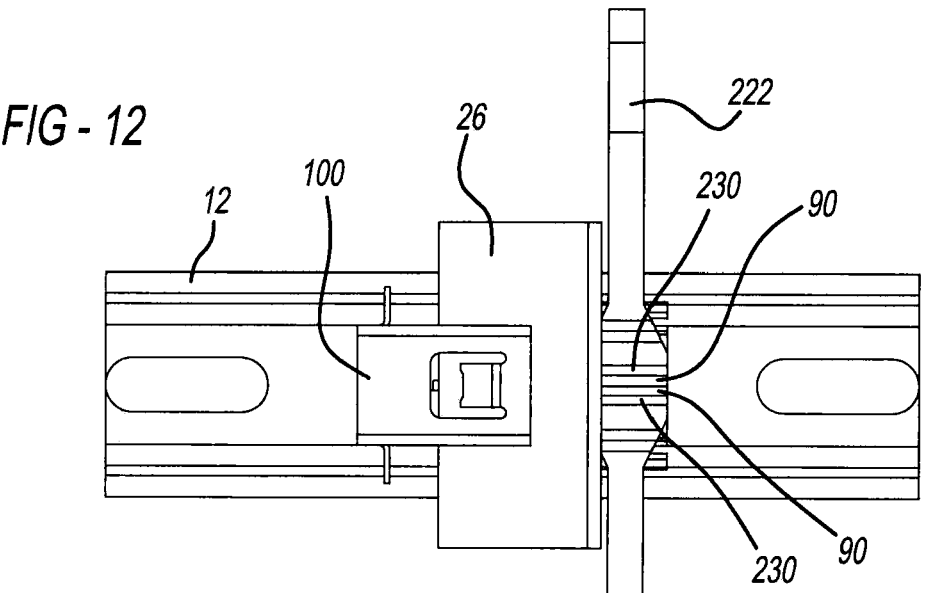
FIG. 12 is a top elevational view showing the lower removal tool engaging the first embodiment fastener.
Figure 13:
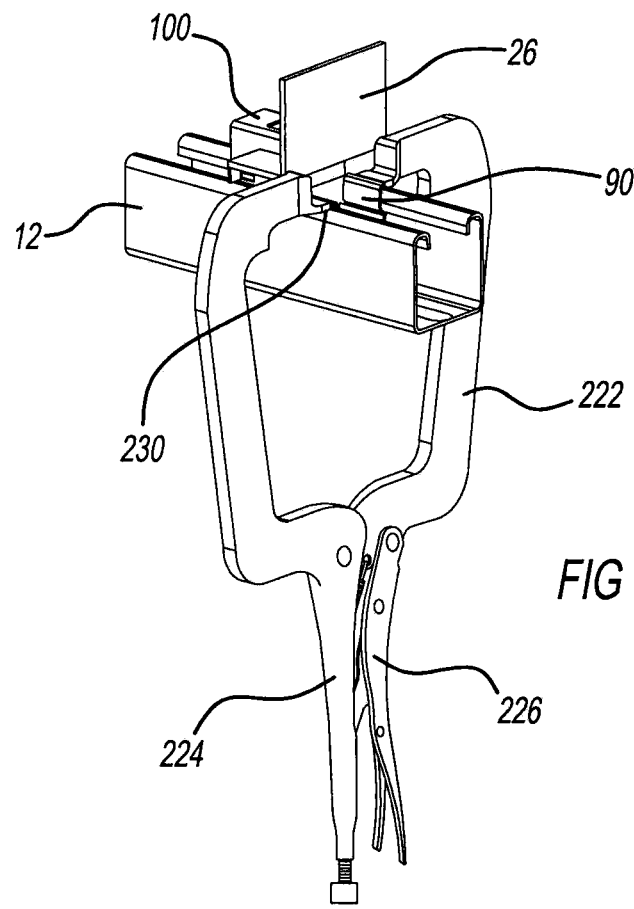
FIG. 13 is a perspective view showing the lower removal tool engaging the first embodiment fastener.

A second embodiment lower removal tool 220 is shown in FIGS. 10 and 11. This tool has a pair of spaced apart jaws 222 and handles 224, 226 and 228, like that of the prior embodiment. A locking, adjustment and release mechanism are also similarly provided. However, tips 230 are downwardly stepped from an upper surface 232 of each jaw, which is opposite that of the prior embodiment. Either embodiment lower tool 170 or 220 can be used for removal of the fastener, but only the second embodiment lower tool 220 will be discussed hereinafter by way of example.

Figure 14:
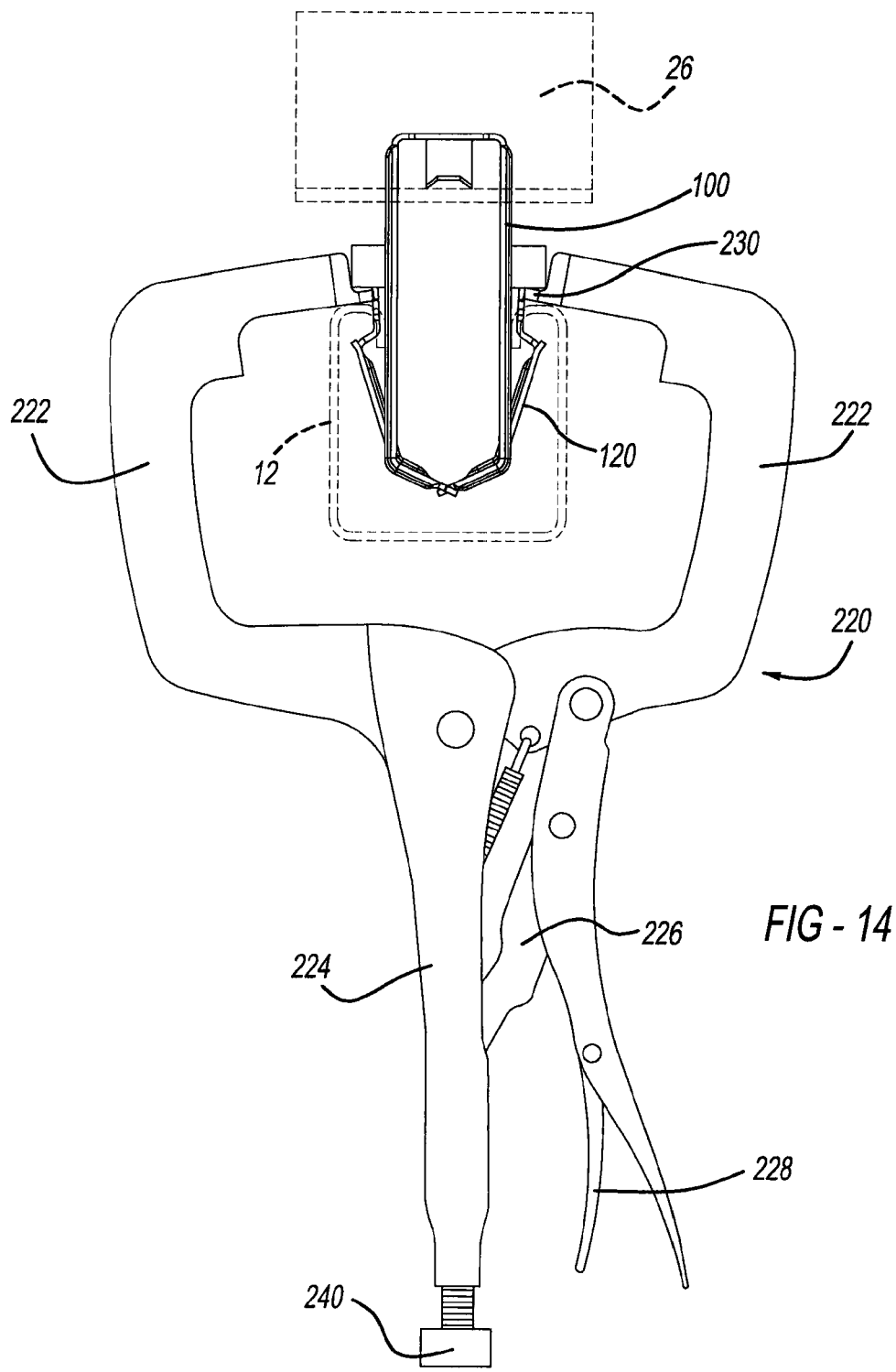
FIG. 14 is an end elevational view showing the lower removal tool initially contacting a second embodiment of a photovoltaic frame fastener.
Figure 15:
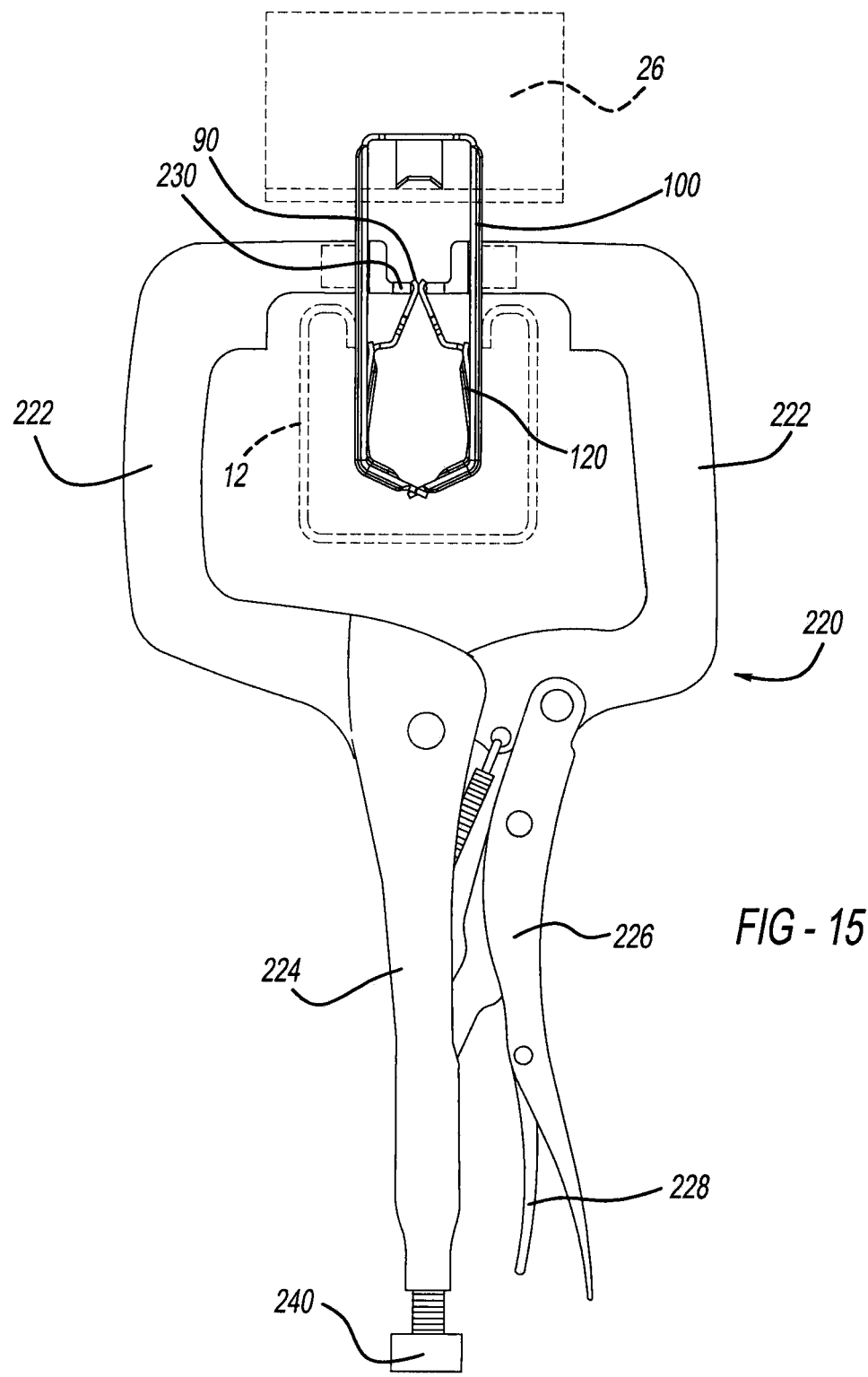
FIG. 15 is an end elevational view like that of FIG. 14, showing the lower removal tool inwardly compressing wings of the first embodiment fastener.
Figure 16:
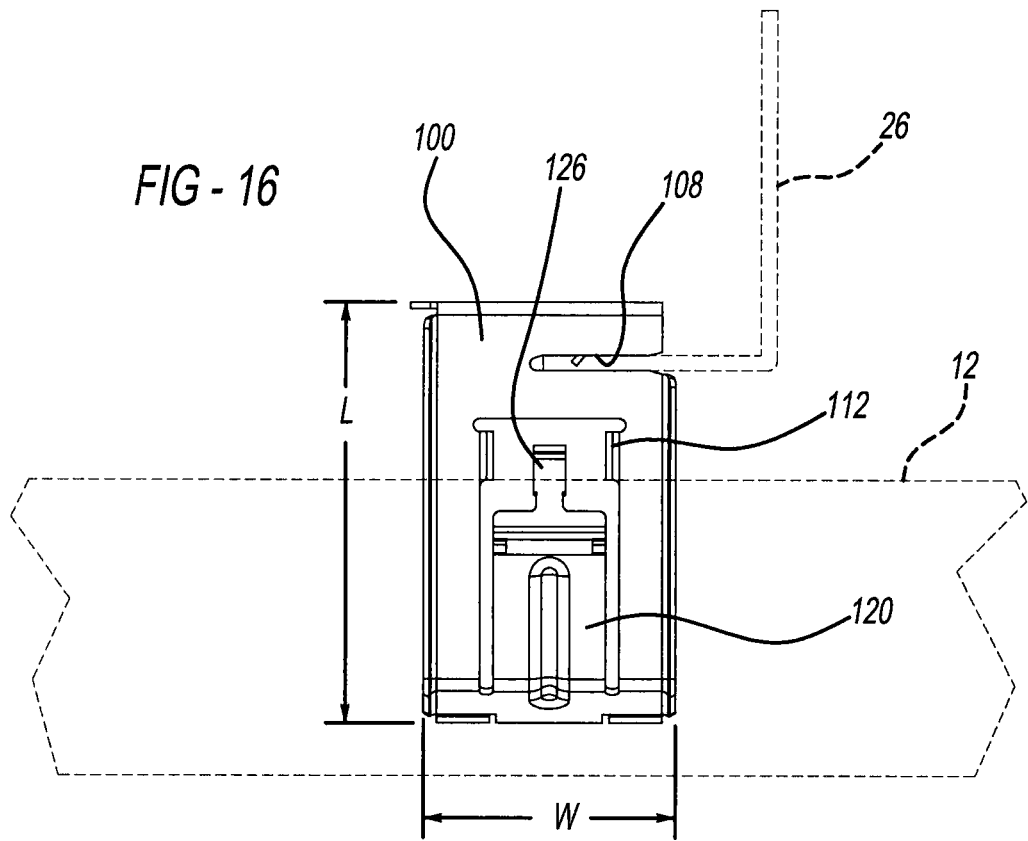
FIG. 16 is a side elevational view showing the second embodiment photovoltaic frame fastener assembly.
Figure 17:
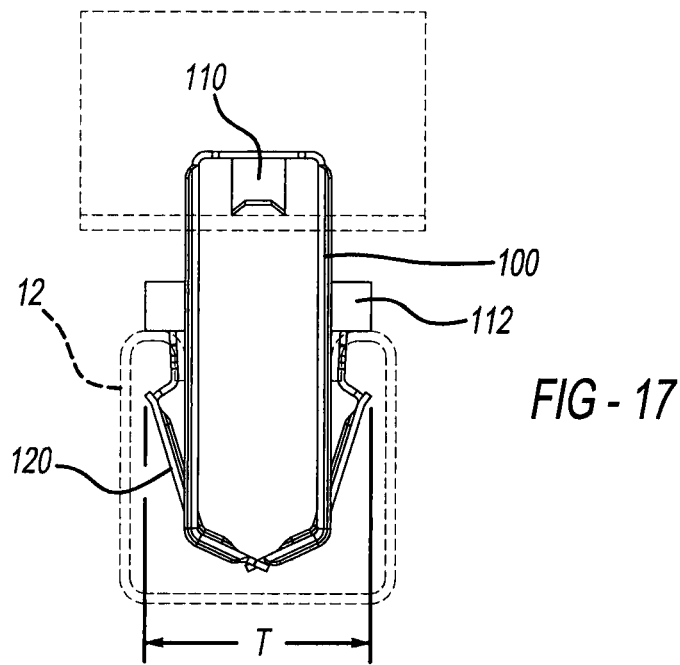
FIG. 17 is an end elevational view showing the second embodiment photovoltaic frame fastener assembly.
Figure 18:
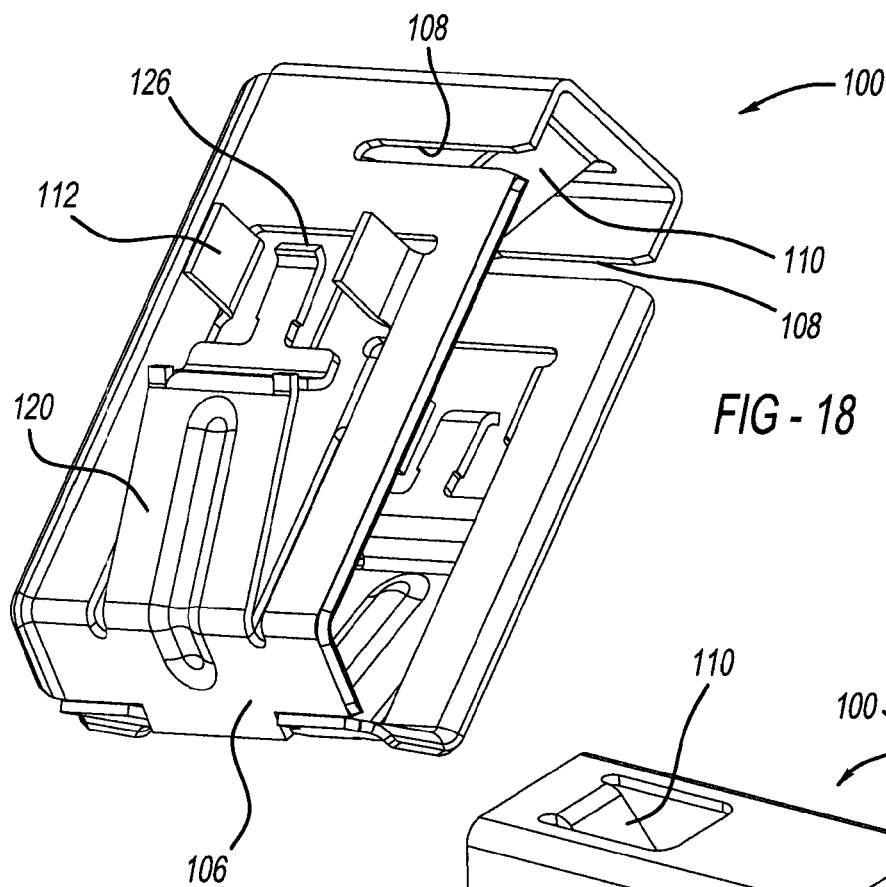
FIG. 18 is a perspective view showing the second embodiment photovoltaic frame fastener.
Figure 19:
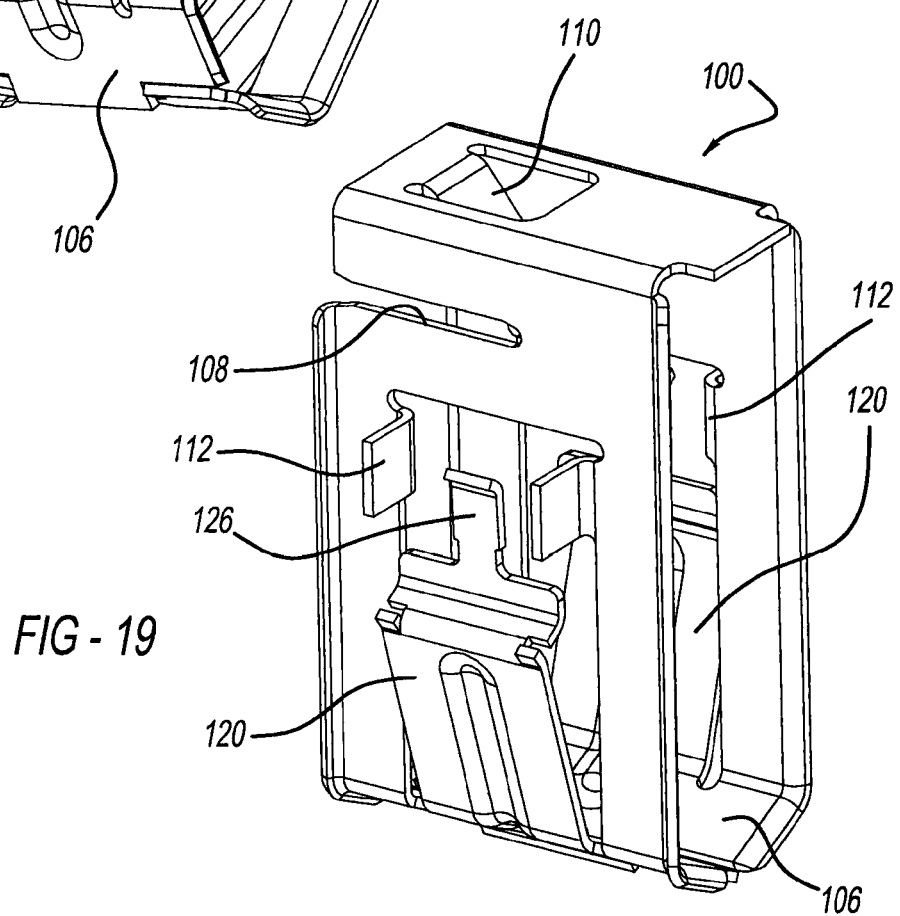
FIG. 19 is a perspective view, taken opposite that of FIG. 18, showing the second embodiment photovoltaic frame fastener.
Figure 20:
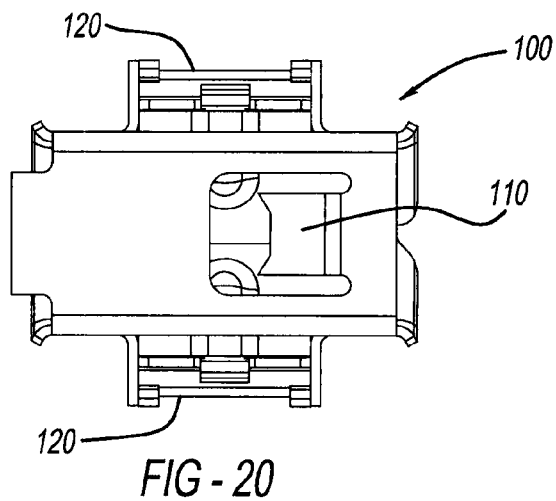
FIG. 20 is a top elevational view showing the second embodiment photovoltaic frame fastener.
Figure 21:
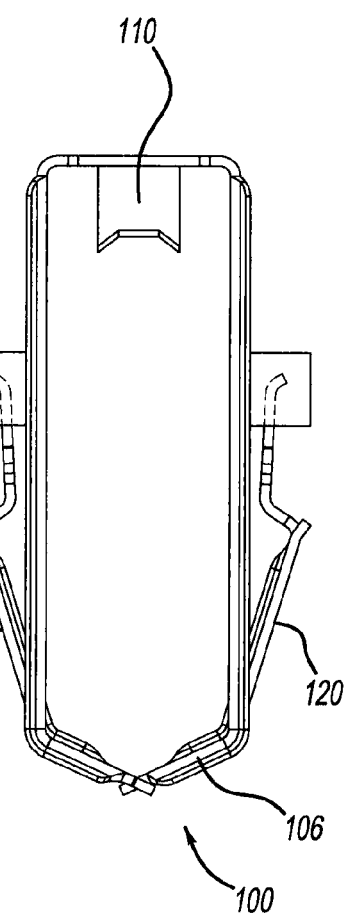
FIG. 21 is an end elevational view showing the second embodiment photovoltaic frame fastener.
Figure 22:
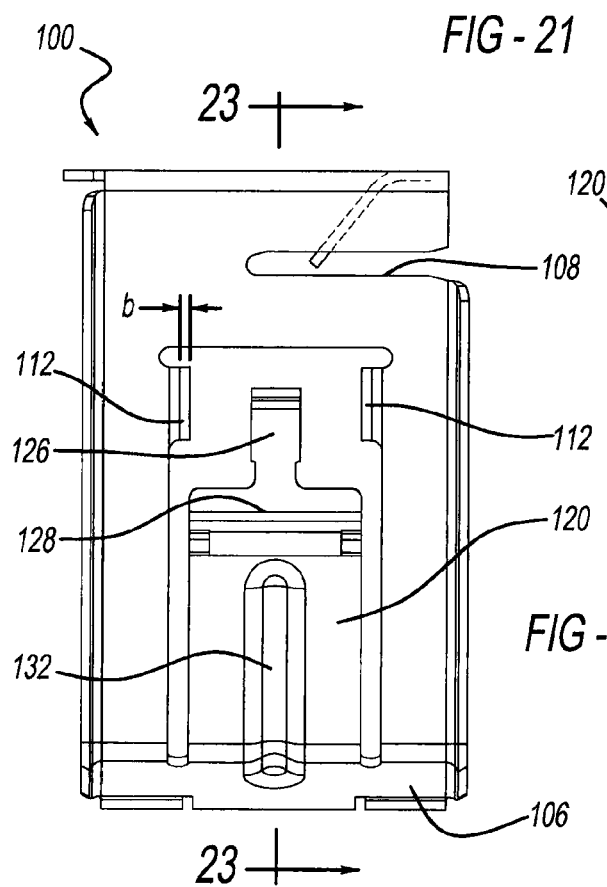
FIG. 22 is a side elevational view showing the second embodiment photovoltaic frame fastener.
Figure 23:
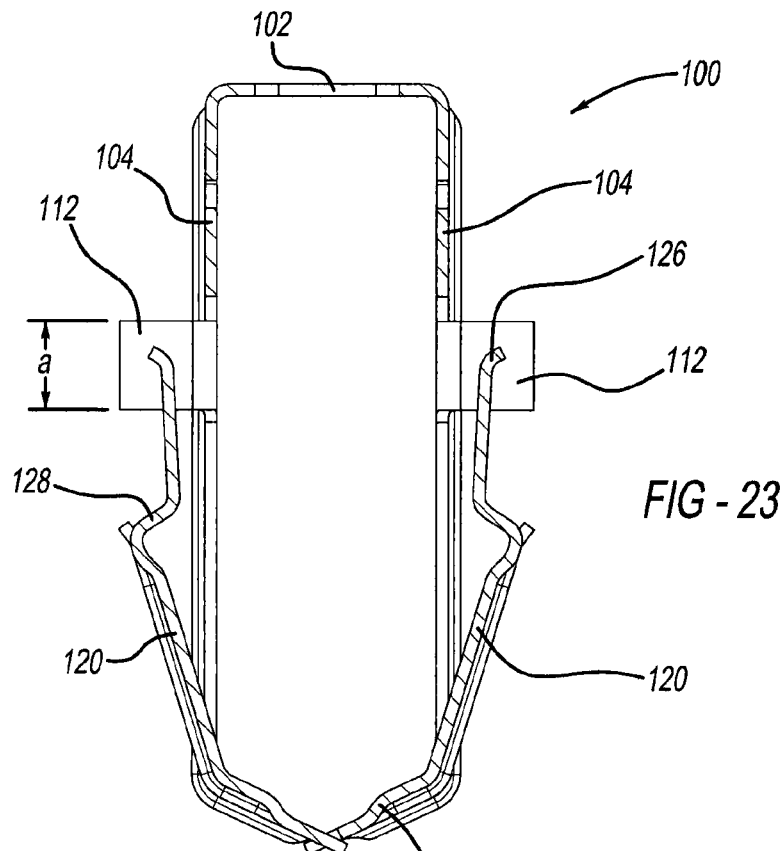
FIG. 23 is a cross-sectional view, taken along lines 23-23 of FIG. 22, showing the second embodiment photovoltaic frame fastener.
Figure 24:
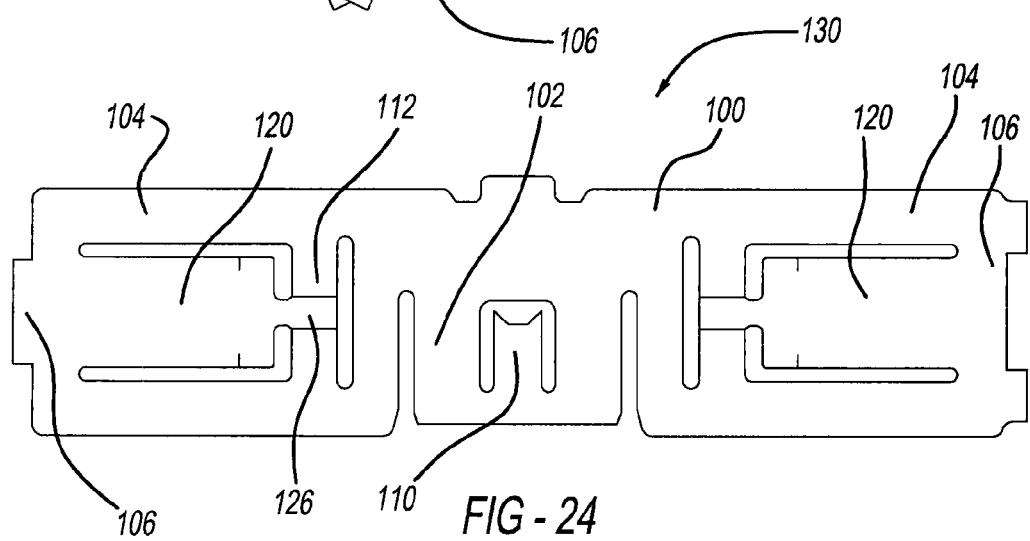
FIG. 24 is a top elevational view showing a flat blank used to create the second embodiment photovoltaic frame fastener.
Figure 25:
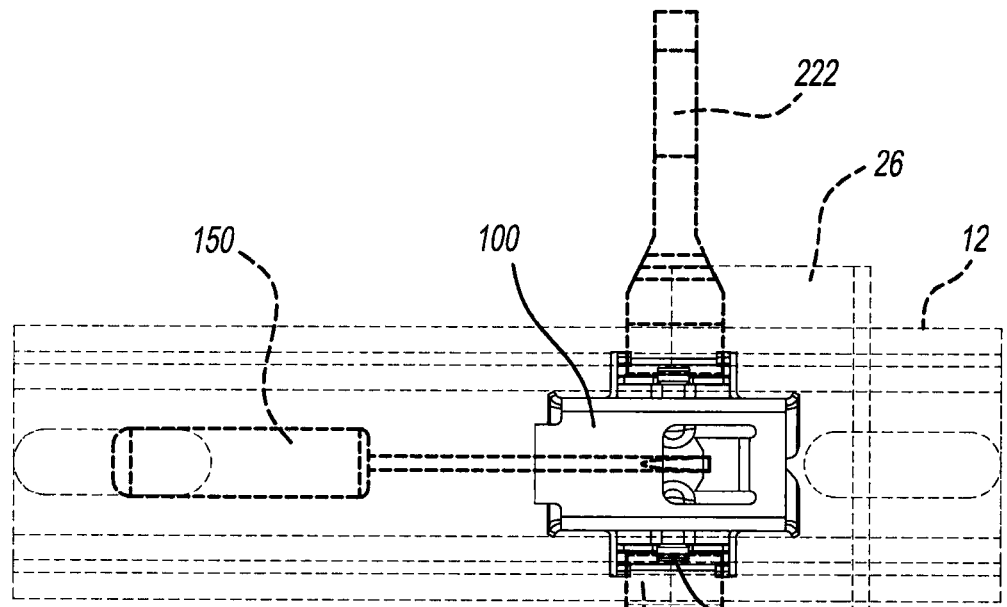
FIG. 25 is a top elevational view showing the upper and lower removal tools used with the second embodiment photovoltaic frame fastener assembly.
Figure 26:
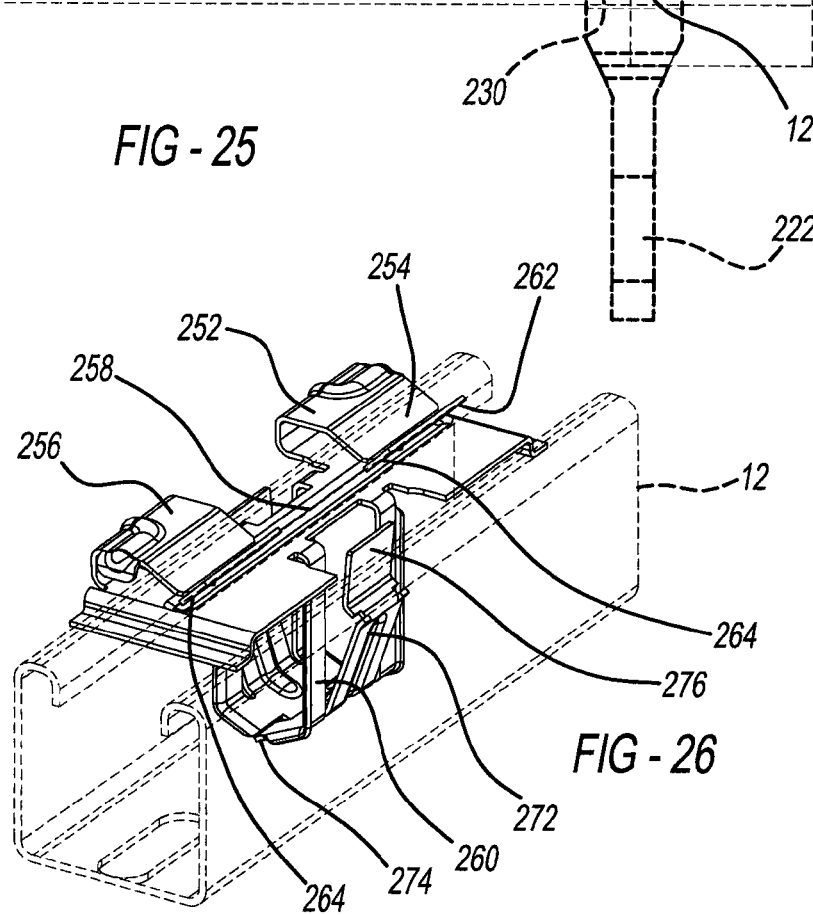
FIG. 26 is a perspective view showing a third embodiment photovoltaic frame fastener assembly.
Figures 27, 28:
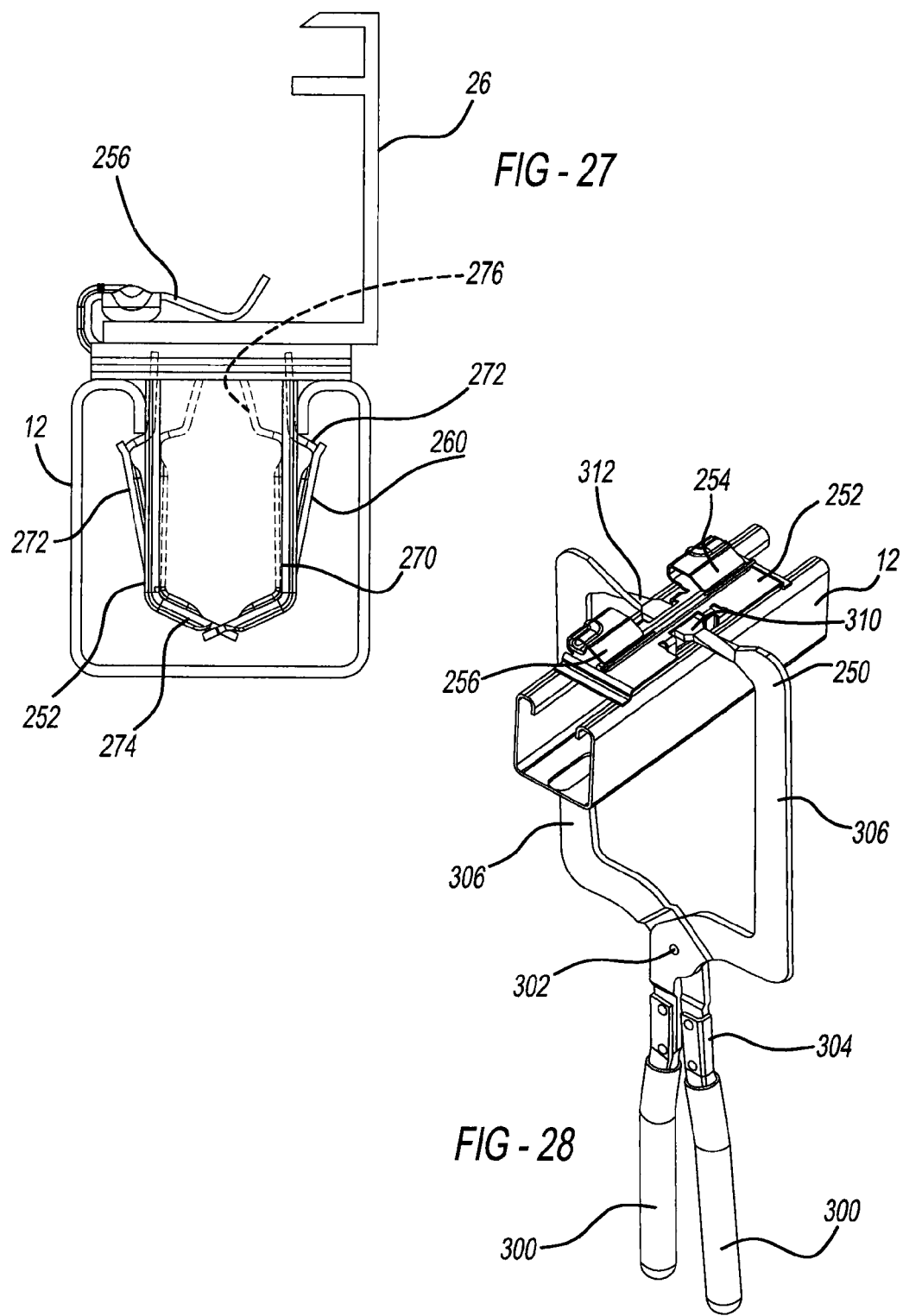
FIG. 27 is an end elevational view showing the third embodiment photovoltaic frame fastener.
FIG. 28 is a perspective view showing a third embodiment of a lower removal tool, used with the third embodiment photovoltaic frame fastener assembly.
Figure 29:
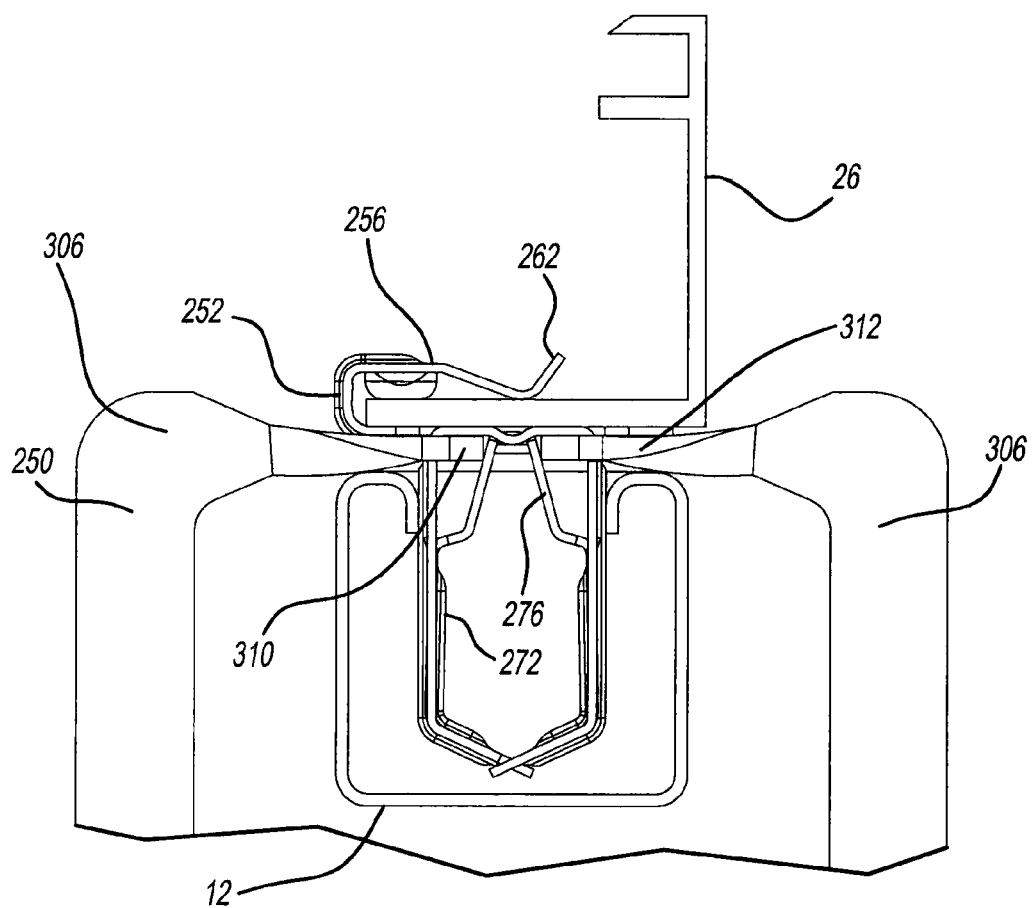
FIG. 29 is an end elevational view showing the third embodiment lower removal tool and third embodiment photovoltaic frame fastener assembly in a fully compressed condition.

The construction or service person initially approaches fastener 100 (by way of non-limiting example) from below strut 12. The person thereafter essentially surrounds a cross-section of strut 12 by jaws 222 as tips 230 make initial contact with fingers 126 (as can best be observed in FIGS. 14 and 16) accessible above the upper surface of strut 12. Next, the construction person fully squeezes together handles 224 and 226 such that the camming link will put the tool in a locking and fully clamped position, which causes tips 230 of tool 220 to be in their fully compressed position (as adjusted by adjustment screw 240). Consequently, tips 230 inwardly compress fingers 126 and the attached wings 120 toward each other and the fastener centerline, such that the wings can thereafter be longitudinally and linearly pulled free of strut 12 through the upper opening therein while staying engaged by tool 220. After full removal, release handle 228 is pulled toward auxiliary handle 226 to release the locking mechanism and thereby disengage tool 220 from fastener 100.

It is noteworthy that no portion of the tool needs to be inserted into the strut for fastener removal. Furthermore, the locking and unlocking feature of lower removal tool 220 is also advantageous by allowing for hands-free wing compression after the tool clamping position has been set; this is especially advantageous when many of these tools simultaneously engage and compress multiple fasteners for the same solar panel module whereafter the construction person can then use both of this hands for pulling up on the frame to remove all of the fasteners from the strut at the same time. Lower removal tool 220 is designed to not damage the fasteners such that they can be repeatedly reused. Moreover, the lower removal tools are preferably cast or stamped from steel, although other materials can be employed.

Referring now to FIGS. 26-29, a third embodiment of a lower removal tool 250 is used to remove a snap-in photovoltaic frame grounding clip 252. Grounding clip 252 includes a pair of spaced apart clamps 254 and 256, an upper bridge 258 and a mounting section 260. Each clamp has a generally C-shape, thereby creating an openly accessible receptacle therebetween. Furthermore, a lead-in wall 262 upwardly and outwardly angles away from each clamp to ease insertion of a flat lateral flange segment of frame 26 therein during assembly. If used for grounding, a pair of pointed barbs 264 internally project from each upper section of clamps 254 and 256. Each barb 264 cuts into and gouges the adjacent surface of frame 26 to scrape off the anodized coating thereat. This provides multiple satisfactory electrical grounding paths between the base material of the frame and the clip. This can be achieved by the simple linear insertion of the clamps of the clip onto the flange of the frame without the need for rotation or a threaded attachment. Alternately, the same fastener clip 252 can be used in a non-electrical grounding manner if barbs 264 are omitted.

Mounting section 260 includes side walls 270 and flexible wings 272. Each wing 272 is flexibly attached adjacent an inwardly tapered distal end 274 and is linearly snap-fit into the opening in strut 12 when installed. A finger 276 projects upwardly from each wing proud of strut. Furthermore, an offset step is located along a longitudinal length of each wing located closer to the finger than the distal end.

This embodiment removal tool 250 has a pair of generally cylindrical and longitudinally elongated handles 300 rotatably coupled together at pivot 302. A hinge 304 couples each handle 300 to a corresponding jaw 306. A flat and longitudinally thinner tip 310 laterally projects inward from each end of jaw 306 for contacting against and compressing upstanding fingers 276 from the expanded strut-engaging position to an inwardly compressed position 276' whereafter the construction person can linearly remove fastener 252 from strut 12. Since jaws 306 are stamped from 1018 steel, a twist 312 is stamped between tips 310 and jaws 306. Lower removal tool 250 has a scissor handle and pivot arrangement to move jaws 306, but without a locking feature.

Figure 30:
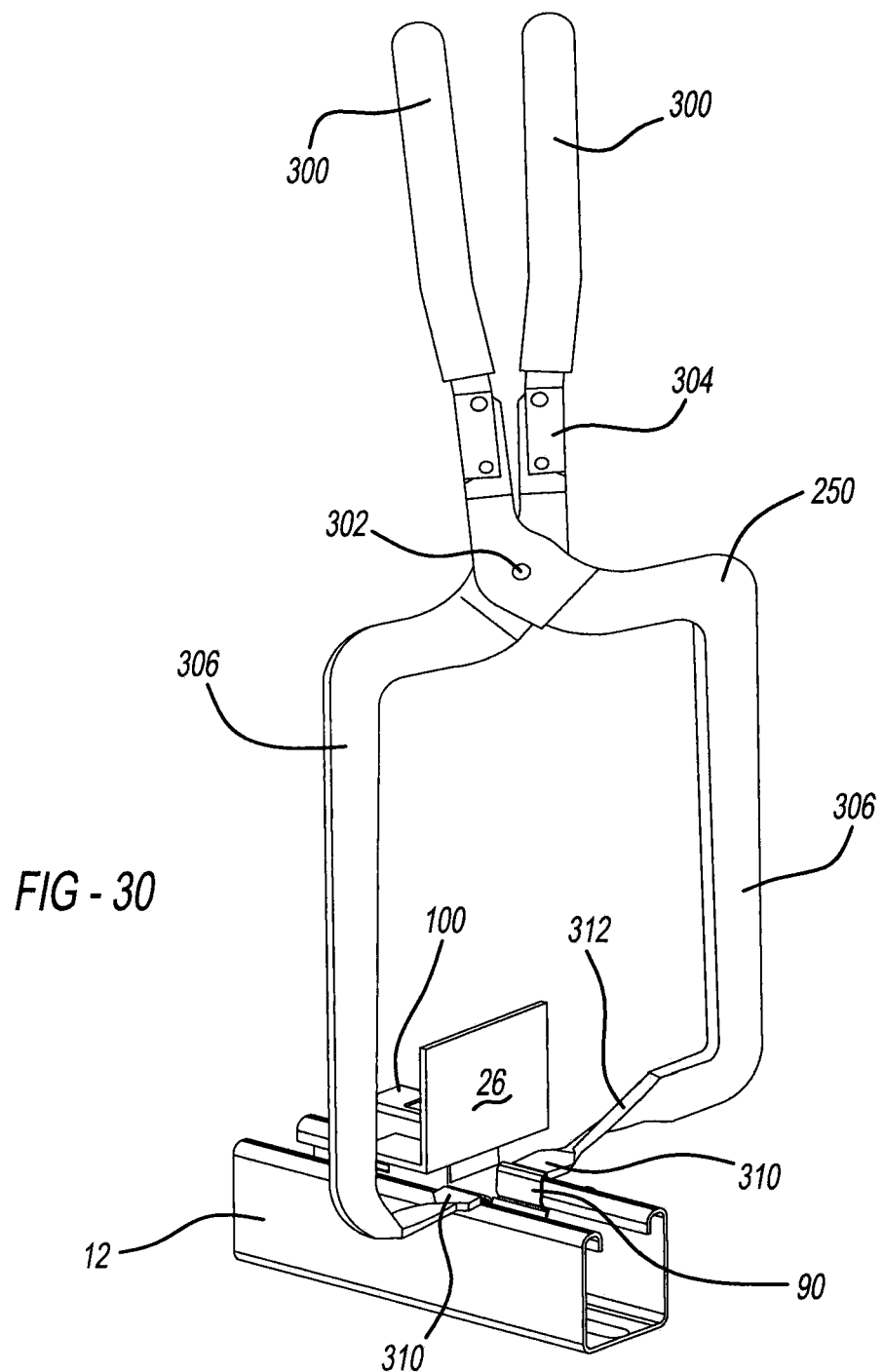
FIG. 30 is a perspective view showing the third embodiment lower removal tool and first embodiment fastener.

As illustrated in FIG. 30, this third embodiment lower removal tool 250 is also well suited for top down access within a gap between a pair of installed solar modules, including frames 26. Tips 310 then contact against and compress fingers 90 and their associated wings of the first embodiment fastener 100. This approach is easiest for a roof-mounted assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. Moreover, when the terms "top," "bottom," "upper," "lower,"

"side," "end," "above," "below," or the like are used, it is not intended to limit the orientation of the part since it is envisioned that the present apparatus can be inverted or positioned at many different orientations. The same may also be varied in many ways. Such variations are not to be regarded as a departure from the disclosure, and all such modifications are intended to be included within the scope and spirit of the present invention.

The invention claimed is:

1. A photovoltaic frame fastener apparatus comprising a single-piece fastener which further comprises:
    a body including a pair of spaced apart photovoltaic frame-receiving slots;
    a strut-engaging, snap-in flexible wing coupled to the body; and
    a flexible frame-contacting tongue projecting from a top surface of the body between side walls bordering the top surface and downwardly extending therefrom, at least one substantially pointed edge of the tongue pointing away from the top surface of the body into an internal space between the side walls.

2. The apparatus of claim 1, further comprising rigid tabs laterally projecting from the side walls of the body, the side walls including the slots therein aligned with the top surface.

3. The apparatus of claim 2, further comprising an elongated structural strut including an opening, the wing snapping into the opening, and the tabs abutting against surfaces adjacent to the opening to deter over-insertion of the fastener into the strut.

4. The apparatus of claim 1, further comprising a photovoltaic frame, and the pointed edge of the tongue scoring into the frame in order to secure the frame inside the slots of the fastener.

5. The apparatus of claim 1, wherein the edge of the tongue includes two substantially pointed formations spaced apart by a central valley, the tongue is substantially straight and diagonally oriented relative to the top surface of the body.

6. The apparatus of claim 1, further comprising:
    an elongated and structural strut, the strut having a substantially U-shaped end view with its internal surfaces being reverse-turned walls;
    a glass photovoltaic panel mounted to a photovoltaic frame, the panel and frame hiding a majority of the fastener from an outside direction when the fastener is completely attached to the strut; and
    a second flexible wing coupled to the body of the fastener, the wings removably abutting against edges of the reverse-turned walls.

7. The apparatus of claim 1, wherein the wing is offset from the body of the fastener along a direction of elongation of a structural strut, further comprising a finger upstanding from the wing and having a smaller width than the wing.

8. The apparatus of claim 1, wherein the wing is directly below the slots and the tongue, and the fastener has substantially vertical length greater than its width and thickness.

9. The apparatus of claim 1, wherein the tongue is entirely inwardly spaced from all external edges of the body of the fastener.

10. The apparatus of claim 1, wherein the strut is mounted to a building roof.

11. The apparatus of claim 1, wherein the entire fastener is a single bent sheet of metal.

12. A photovoltaic frame fastening apparatus comprising a fastener further comprising:
    a body including a photovoltaic frame-receiving opening, a top end and a bottom end, the bottom end being located opposite the top end and being adapted for reception into an elongated strut, and the opening being located between the top and bottom ends of the body;
    a flexible wing coupled to the body; and
    rigid tabs laterally projecting away from each other from opposite side walls of the body, the tabs being longitudinally located between the top and bottom ends of the body;
    the side walls being spaced apart from each other; and
    at least one of the tabs being longitudinally located between a first lateral line defined by a strut-engaging edge of the wing and a second lateral line defined by an elongated surface of the opening.

13. The apparatus of claim 12, wherein there are at least two of the rigid tabs projecting from each of the side walls, and each of the tabs are spaced away from each other, at least one of the tabs is directly positioned between the opening and the wing, the opening is elongated in a direction perpendicular to an elongation direction of the wing, and the fastener is entirely metallic.

14. The apparatus of claim 13, wherein at least part of the wing is located substantially between a pair of the tabs, each of the tabs including a distal edge elongated in a direction offset from an elongation direction of the opening.

15. The apparatus of claim 12, further comprising an elongated structural strut including an opening therein, the wing of the fastener snapping into the opening of the strut and the tabs abutting against an outside surface of the strut, the tabs being entirely spaced below a planar top wall at the top end of the fastener.

16. The apparatus of claim 15, further comprising a photovoltaic frame including a metallic flange which is secured within the opening of the fastener body by engagement of an edge of a flexible tongue integrally bent from the body.

17. The apparatus of claim 12, wherein each of the rigid tabs has a longitudinal dimension at least as long as a transverse dimension projecting away from the corresponding side wall of the body, and planes defined by the longitudinal and transverse dimensions of all of the tabs being substantially parallel to each other.

18. The apparatus of claim 12, wherein the wing is offset from the body of the fastener along a direction of elongation of a structural strut, further comprising a finger upstanding from the wing and having a smaller width than the wing.

19. The apparatus of claim 12, wherein the wing is directly below at least a portion of the opening in the body, which is an elongated slot, and the wing further includes a step and a centrally projecting and laterally smaller finger located adjacent and between a pair of the tabs.

20. A photovoltaic frame fastening apparatus comprising a metallic fastener which further comprises:
    a body including a side wall with a slot;
    flexible wings coupled to the body; and
    a tongue downwardly projecting from a top wall, the top wall being substantially perpendicular to the side wall;
    the tongue including at least two substantially pointed formations spaced apart by a central valley.

21. The apparatus of claim 20, further comprising an elongated structural strut including an opening therein, the wings of the fastener snapping into the opening of the strut, and outwardly extending tabs abutting against an outside of the strut.

22. The apparatus of claim 21, further comprising a photovoltaic frame including a metallic flange which is secured within the slot of the fastener body by engagement of an edge of the tongue integrally bent from the body.

23. The apparatus of claim 20, wherein the tongue is entirely inwardly spaced from all external edges of the body of the fastener.

24. The apparatus of claim 20, wherein the entire fastener is a single bent sheet of metal.

25. The apparatus of claim 20, further comprising:
a second side wall, the side walls being spaced apart from each other and only connected together by the top wall and an opposite, tapered and overlapping lead-in end;
each of the wings being solely connected to the body adjacent the lead-in end; and
a second and open-ended slot in the body, the slots being aligned for receiving a photovoltaic frame with the tongue located substantially between the slots.

26. The apparatus of claim 20, further comprising a photovoltaic frame and a roof-mounted structural strut, the frame being inserted into the slot and being engaged by the formations of the tongue in a single linear installation motion that is of less force as compared to an extraction force, and the fastener snapping into an opening of the strut in a single linear installation motion.

27. A photovoltaic frame fastening apparatus comprising a single piece fastener which further comprises:
a top wall;
side walls projecting from the top wall, at least one of the side walls including an elongated photovoltaic frame-receiving slot;
tapered lead-in walls connected to the side walls opposite the top wall, the slot being closer to the top wall than the slot is to the tapered lead-in walls;
the side walls being spaced apart from each other with a hollow area therebetween, and front and back edges of the side walls being open;
snap-in wings connected to and externally projecting from the side walls between the slot and the lead-in walls, each of the wings being pivotable about an axis parallel to the slot; and
a longitudinal dimension between the top and lead-in walls being larger than lateral and transverse dimensions of the fasteners.

28. The apparatus according to claim 27, further comprising rigid tabs laterally and oppositely projecting from the side walls, the tabs being substantially parallel to each other.

29. The apparatus according to claim 27, further comprising an elongated structural strut including an opening, the wings snapping into the opening, and tabs of the fastener abutting against surfaces adjacent to the opening to deter over-insertion of the fastener into the strut.

30. The apparatus according to claim 27, further comprising a photovoltaic frame, and an edge of a tongue internally extending from the top wall scoring into the frame in order to secure the frame inside the slot of the fastener.

31. The apparatus according to claim 27, further comprising an edge of a flexible tongue projecting from the fastener, the edge including two substantially pointed formations spaced apart by a central valley, and the tongue being diagonally oriented relative to an adjacent section of the fastener.

32. The apparatus of claim 27, wherein the entire fastener is a single bent sheet of metal, and the tapered lead-walls are adapted for insertion into an elongated and substantially U-cross-sectionally shaped rail which includes edges for engaging the wings, and the slot is adapted for receiving a section of a photovoltaic frame therein.

33. A photovoltaic frame fastening apparatus comprising:
(a) an elongated structural rail including an opening therein;
(b) a photovoltaic assembly including a glass solar panel and a peripheral frame;
(c) a single-piece and metallic fastener comprising:
(i) two spaced apart side walls connected by a lateral wall;
(ii) a member internally projecting from the lateral wall of the fastener diagonally toward an end of the fastener and at least a majority of the member being located between the side walls, spaced apart edge sections of the member being removeably secured to the frame; and
(iii) projections flexibly bent outward from the fastener snapping into the opening of the rail.

34. The apparatus of claim 33, further comprising at least two rigid tabs projecting from each of the side walls, each of the tabs being spaced away from each other.

35. The apparatus of claim 33, wherein the member is a tongue downwardly extending in a diagonal manner from the lateral wall toward the end of the fastener which is a pointed and closed end, and the tongue is entirely inwardly spaced from all external edges of the fastener, and each of the wings is entirely inwardly spaced from all of the external edges of the fastener.

* * * * *